United States Patent [19]
Renfroe

[11] 3,835,149
[45] Sept. 10, 1974

[54] 3-AROYL-ALKENYLENEIMINES

[75] Inventor: Harris Burt Renfroe, New City, N.Y.

[73] Assignee: Ciba-Geigy Corporation, Ardsley, N.Y.

[22] Filed: July 7, 1972

[21] Appl. No.: 269,901

Related U.S. Application Data

[63] Continuation-in-part of Ser. No. 203,479, Nov. 30, 1971, abandoned.

[52] U.S. Cl. 260/297 R, 260/239 BE, 260/294.8 E, 260/295 R, 260/295 AM, 260/296 R, 260/326.2, 260/326.4, 260/326.47, 260/326.5 J, 260/295.5, 260/332.3 C, 260/332.3 R, 260/332.2 R, 260/570.5 C, 424/244, 424/263, 424/274, 424/275

[51] Int. Cl.. C07d 29/38, C07d 27/14, A61k 27/00

[58] Field of Search.... 260/297 R, 326.5 J, 239 BE, 260/295 R, 295 AM, 296 R, 294.8 E, 326.2, 326.4, 326.47

[56] References Cited
UNITED STATES PATENTS
3,489,769   1/1970   Helsley et al. .................. 260/326.5

OTHER PUBLICATIONS

Lyle, et al., Bol. Soc. Quim. Peru 31(3), 89–103, 1965.

*Primary Examiner*—Henry R. Jiles
*Assistant Examiner*—C. M. S. Jaisle
*Attorney, Agent, or Firm*—Joseph G. Kolodny

[57] ABSTRACT

3-Aroyl-lower alkenyleneimines, e.g. those of the formula

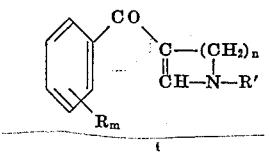

R = H, alkyl, free, etherified or esterified OH, $CF_3$ or an amino
R' = H, alkyl or acyl
m = 1 or 2   n = 2–4 or carbonyl or amino derivatives thereof are anti-inflammatory agents.

6 Claims, No Drawings

3-AROYL-ALKENYLENEIMINES

CROSS-REFERENCE TO RELATED APPLICATION

This is a continuation-in-part of application Ser. No. 203,479, filed Nov. 30, 1971 (now abandoned).

The present invention concerns and has for its object the provision of new 3-aroyl-lower alkenyleneimines, more particularly of those corresponding to Formula I

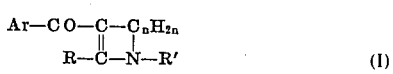

wherein Ar is a monocyclic iso- or heterocyclic aromatic radical, the alkylene group $C_nH_{2n}$ separates the carbon from the nitrogen atom by 2–4 carbon atoms, $n$ is an integer from 2 to 7, and each of R and R' is hydrogen or lower alkyl, or therapeutically acceptable functional carbonyl or amino derivatives thereof, of corresponding pharmaceutical compositions and of methods for the preparation and application of these products, which are useful anti-inflammatory agents.

DESCRIPTION OF THE PREFERRED EMBODIMENTS

An isocyclic aromatic radical Ar is preferably unsubstituted phenyl, or phenyl substituted by one or more than one, preferably one or two, of the same or different members selected from lower alkyl, e.g. methyl, ethyl, n- or i-propyl or -butyl, free, etherified or esterified hydroxy, such as lower alkoxy, e.g. methoxy, ethoxy, n- or i-propoxy or -butoxy, lower alkanoyloxy, e.g. acetoxy, propionyloxy or pivaloyloxy, or halogen, e.g. fluoro, chloro or bromo; trifluoromethyl; amino or di-lower alkylamino, e.g. dimethyl- or diethylamino. The term "lower," referred to above or hereinafter in connection with organic radicals or compounds respectively, defines such with up to 7, preferably up to 4, carbon atoms.

A heterocyclic aromatic radical is preferably unsubstituted thienyl or pyridyl, e.g. 2- or 3-thienyl, 2- or 4-pyridyl, or such radicals substituted by one or more than one, preferably up to 2 lower alkyl groups, e.g. those mentioned above.

Preferred aromatic radicals Ar are phenyl, (lower alkyl)$_m$-phenyl, (hydroxy)$_m$-phenyl, (lower alkoxy)$_m$-phenyl, (lower alkanoyloxy)$_m$-phenyl, (halogeno)$_m$-phenyl, (trifluoromethyl)$_m$-phenyl, (amino)$_m$-phenyl, (di-lower alkylamino)$_m$-phenyl, (lower alkyl or trifluoromethyl)-halophenyl, thienyl, (lower alkyl)-thienyl, pyridyl or (lower alkyl)-pyridyl and m is the integer 1 or 2.

The lower alkylene group $C_nH_{2n}$ preferably represents ethylene, 1,2- or 1,3-propylene, 2-methyl-1,3-propylene, 1,2-, 1,3-, 1,4- or 2,3-butylene, but also, for example, 2-methyl-(1,3- or 1,4)-butylene, 1,2-, 1,3-, 1,4-, 2,3- or 2,4-pentylene or -hexylene. Preferred groups $C_nH_{2n}$ are $(CH_2)_n$, wherein $n$ is an integer from 2 to 4.

R and R' preferably represent hydrogen, but also lower alkyl, e.g. that mentioned above.

Functional derivatives of the compounds of Formula I are either carbonyl or amino derivatives, preferably the oxime or the O-(methyl, ethyl, n- or i-propyl; 2-dimethylaminoethyl or 3-diethylaminopropyl)-oxime, or the lower alkanoyl, alkoxy- or aminocarbonyl or aralkanoyl derivatives of the primary or secondary amines or imines respectively; such as the acetyl, propionyl, pivaloyl; methoxy- or ethoxycarbonyl; Ar-lower alkanoyl or Ar-carbonyl, carbamoyl, N-Ar-carbamoyl or -thiocarbamoyl, e.g. phenylacetyl, benzoyl, nicotinoyl, N-phenylcarbamoyl or -thiocarbamoyl derivatives, or therapeutically useful acid addition salts of the amino or pyridine compounds, e.g. such derived from the acids mentioned below.

The compounds of the invention exhibit valuable pharmacological properties. Apart from analgetic and antipyretic effects, they primarily exhibit anti-inflammatory activity. This can be demonstrated in animal tests, using advantageously mammals, such as mice, rats or guinea pigs, as test objects. The compounds of the invention can be administered to the animals either enterally, preferably orally, or parenterally, e.g. subcutaneously or intravenously, for example in the form of aqueous solutions or suspensions. The applied dosage may range between about 1 and 300 mg/kg/day, preferably between about 3 and 100 mg/kg/day, advantageously between about 10 and 50 mg/kg/day. The tests chosen are among the classical assay methods for said activities, such as the acetic acid stretch test in mice, the brewers yeast antipyresis, carageenin or pronase paw edema, adjuvant arthritis or cotton pellet granuloma test in rats or the U.V. erythema test in guinea pigs.

Thus, for example, the 3-benzoyl-1,4,5,6-tetrahydropyridine, a representative member of the compounds of Formula I, is active at p.o. doses as low as 1–10 mg/kg/day, in the suppression of the cellular (chronic) phase of inflammation, as evidenced by the adjuvant arthritis or granuloma pouch essay and does not exhibit substantial ulcerogenicity in rats at doses as high as 300 mg/kg/day × 4. Accordingly, the compounds of the invention are useful anti-inflammatory agents, for example, in the treatment or management of arthritic and dermato-pathologic conditions.

Particularly active in said tests are compounds of Formula I, in which Ar is unsubstituted phenyl, thienyl, pyridyl, or phenyl substituted by up to two members selected from lower alkyl, hydroxy, lower alkoxy, lower alkanoyloxy, halogeno, trifluoromethyl, amino or di-lower alkylamino, or thienyl or pyridyl substituted by up to two lower alkyl groups, the alkylene group $C_nH_{2n}$ separates the carbon from the nitrogen atom by 2–4 carbon atoms, $n$ is an integer from 2 to 7, and each of R and R' is hydrogen or lower alkyl, the oxime or an O-(lower alkyl or di-lower alkylamino-lower alkyl)-oxime thereof, a lower alkanoyl, lower alkoxycarbonyl, Ar-lower alkanoyl, Ar-carbonyl, carbamoyl, N-Ar-carbamoyl or -thiocarbamoyl derivative of the primary or secondary amines or imines, or a therapeutically useful acid addition salt of the amino or pyridine compounds.

Preferred are those compounds of Formula I, wherein Ar is phenyl, (lower alkyl)$_m$-phenyl, (hydroxy)$_m$-phenyl, (lower alkoxy)$_m$-phenyl, (lower alkanoyloxy)$_m$-phenyl, (halogeno)$_m$-phenyl, (trifluoromethyl)$_m$-phenyl, (amino)$_m$-phenyl, (di-lower alkylamino)$_m$-phenyl, (lower alkyl or trifluoromethyl)-halophenyl, thienyl, (lower alkyl)-thienyl, pyridyl or (lower alkyl)-pyridyl, $m$ is the integer 1 or 2, the alkylene group $C_nH_{2n}$ separates the carbon from the nitrogen atom by 2–4 carbon atoms, $n$ is an integer from 2 to 7, and each of R and R' is hydrogen or lower alkyl, or a 1-lower alkanoyl, 1-lower alkoxy-carbonyl, 1-N-phenyl-carbamoyl or -thiocarbamoyl derivative of the compounds in which R' is hydrogen or a therapeutically useful acid addition salt of the amino or pyridine compounds.

Especially valuable are compounds of Formula II

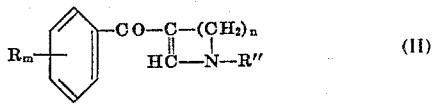

in which R is hydrogen, methyl, ethyl, hydroxy, methoxy, acetoxy, fluoro, chloro, bromo, trifluoromethyl, amino or dimethylamino, R'' is hydrogen, methyl, ethyl, acetyl, propionyl, pivaloyl, methoxy- or ethoxy-carbonyl,N-phenyl-carbamoyl or -thiocarbamoyl and m is the integer 1 or 2 and n is an integer from 2 to 4, or a therapeutically useful acid addition salt of the amino compounds.

Outstanding are those compounds of Formula II, in which R is hydrogen, fluoro or chloro, preferably in the meta- or paraposition, R'' is hydrogen, m is the integer 1 and n the integer 3.

The compounds of this invention are prepared according to known methods, preferably by:
a. reducing a corresponding 3-aroyl-(pyrrole, pyridine, 1,4-dihydropyridine, azepine, 4,5- or 6,7-dihydroazepine) or a quaternary salt thereof or
b. ring-closing a corresponding araliphatic dioxo compound, e.g. such of the formulae

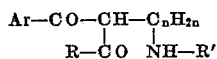

or

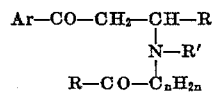

or
c. condensing a corresponding carboxylic acid or a reactive functional derivative thereof, with an iso- or heterocyclic aromatic compound or alkenyleneimine respectively, or a salt thereof, e.g. those of the formulae

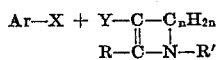

wherein one of X and Y is hydrogen or a metal atom and the other is free or functionally converted carboxy, or
d. converting in a compound of the formula

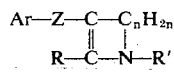

wherein Z is a radical convertible into carbonyl, Z into carbonyl and, if desired, converting any resulting compound into another compound of the invention.

The reduction according to a) is preferably done with a proper amount of catalytically activated or nascent hydrogen, e.g. hydrogen in the presence of nickel, palladium or platinum catalysts, or hydrogen generated by electrolysis. Preferred is the reduction of 3-aroyl-pyridines, or especially 3-aroyl-1-lower alkyl-pyridinium salts, which latter can be present in but small amounts, i.e. generated in the presence of lower alkyl halides or sulfates.

The first ring-closure according to b) occurs, for example, in the condensation of corresponding dioxo compounds, i.e. those of the formula Ar—CO—CH$_2$—CO—R, with corresponding aziridines, to form pyrrolines of Formula I, or by reacting metal derivatives of said dioxo compounds, e.g. alkali metal derivatives, with reactive esters of corresponding aminoalkanols, e.g. the halides or sulfonates thereof, such as the chlorides, bromides, benzene- or toluenesulfonates thereof. The second ring-closure is advantageously carried out under basic conditions, e.g. in the presence of alkali metal hydroxides, to yield a 3-aroyl-4-hydroxyalkyleneimine first. This dehydrates under pyrolytic conditions, preferably in the presence of acids or their anhydrides, e.g. sulfuric, acetic or trifluoroacetic acid or their anhydrides.

The condensation according to c) is carried out either with the free acids or reactive functional derivatives thereof, such as esters or halides, e.g. the lower alkyl esters or acid chlorides thereof, under acidic conditions according to Friedel-Crafts, i.e. in the presence of strong Lewis acids, such as polyphosporic acid, aluminum or zinc chloride respectively, or under basic conditions when using said metal compounds, preferably alkali metal, e.g. lithium or sodium compounds, and the acid esters or halides.

In the starting material mentioned under item d) a radical Z is, for example, an imino- or hydroxymethylene group. The former is conveniently converted into carbonyl by hydrolysis, e.g. by mild acidic or alkaline hydrolysis, and the latter is converted into carbonyl by standard oxidation methods, for example, with the use of air or pure oxygen, preferably in the presence of catalysts, such as silver, manganese, iron or cobalt catalysts, or with oxidation agents, e.g. hydrogen peroxide or nitric oxides, oxidizing acids or their salts, such as hypohalous, periodic, nitric or percarboxylic acids or suitable salts thereof, e.g. sodium hypochlorite or periodate, peracetic, perbenzoic or monoperphthalic acid or heavy metal salts or oxides, such as alkali metal chromates or permanganates, chromic or cupric salts, e.g. halides or sulfates thereof, or silver, mercuric, vanadium V, chromium VI or manganese IV oxide, in acidic or alkaline media respectively. In said oxidations care should be taken not to oxidize the resulting vinylogous amides of Formula I, e.g. to the aromatic compounds mentioned under item a).

The compounds of the invention, so obtained, can be converted into each other according to methods known per se. For example, they may be reacted with corresponding hydroxylamines to form the oximes and resulting hydroxy compounds, primary or secondary amines with reactive functional derivatives of the corresponding alcohols or acids respectively, e.g. with lower alkyl halides, sulfates or sulfonates or reactive acid derivatives, e.g. the halides or anhydrides thereof, such as methyl, ethyl, n- or i-propyl bromide, iodide or p-toluenesulfonate; acetyl, propionyl, ethoxycarbonyl, carbamoyl, phenylacetyl or benzoyl chloride or bromide; acetic or propionic anhydride.

The above-mentioned reactions are carried out according to standard methods, in the presence or absence of diluents, preferably such as are inert to the reagents and are solvents thereof, of catalysts, condensing or said other agents respectively and/or inert atmospheres, at low temperatures, room temperature or elevated temperatures, at atmospheric or superatmospheric pressure. Condensing agents are especially used in the reaction with reactive esters or acid derivatives, in order to eliminate the acid formed. They are basic agents, for example, alkali or alkaline earth metal carbonates or lower alkoxides, or organic nitrogen bases, advantageously aliphatic or aromatic tert. amines, such as tri-lower alkylamines or pyridines, e.g. triethylamine, pyridine or collidine.

Basic compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophan, lysine or arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines, imines or hydroxy compounds (phenols) mentioned, can be used in the form of their alkali metal salts and primary amines mentioned under b) can be formed intermediarily in the reduction of corresponding nitriles. Mainly, those starting materials should be used in the process of the invention that lead to the formation of those compounds indicated above as being specially valuable.

The starting material used is known or, if new, can be prepared according to known methods, e.g. analogous to those illustrated in the examples herein or described by Fuson et al. J. Am. Chem. Soc. 79, 3477 (1957). Thus, for example, the compounds mentioned under item a) can be prepared analogous to the condensation mentioned under item c) i.e. by reacting an aromatic metal compound, such as a lithium or halomagnesium compound, e.g. 3-lithiumpyridyl or phenylmagnesium bromide, with the corresponding acid halogenide or aldehyde, to form either the corresponding ketone or carbinol, which latter, in certain instances, converts into the tautomeric 3-aroyl-dihydrocompound, or is oxidized to the corresponding ketone as described for the carbinol mentioned under item d). The formation of the compounds shown under item b) has been mentioned above or is carried out analogous to U.S. Pat. No. 3,272,838. The acid halide mentioned under item c) can be prepared in the usual manner from the corresponding acid, the conventional esters of which can be obtained from the corresponding aromatic forms analogous to reaction a), for example, as described by Wenkert et al, J. Org. Chem. 33, 747 (1968). The iminomethyl compounds shown under item d) are obtained by condensing Ar-metal, e.g. lithium, compounds with nitriles corresponding to the acid halides of c) and the carbinols of d) are analogously prepared as those mentioned above, i.e. from said Ar-Grignard compounds and the aldehydes corresponding to the acid halides of c).

Starting materials or final products that are mixtures of isomers, can be separated into the single isomers by methods in themselves known, e.g. by fractional distillation, crystallization and/or chromatography. Racemic products can likewise be resolved into the optical antipodes, for example by separation of diastereomeric derivatives thereof, e.g. by the fractional crystallization of d- or l-tartrates, -malates, -mandelates or -camphorsulfonates, e.g. salts or 1-acyl derivatives.

The pharmacologically active compounds of the invention are useful in the manufacture of pharmaceutical compositions comprising an effective amount thereof in conjunction or admixture with excipients suitable for either enteral, parenteral or topical application. Preferred are tablets and gelatin capsules comprising the active ingredient together with a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also c) binders, e.g. magnesium aluminum silicate, starch paste, gelatin, tragacanth, methylcellulose, sodium carboxymethylcellulose and/or polyvinylpyrrolidone, if desired, d) disintegrants, e.g. starches, agar, alginic acid or its sodium salt, enzymes of the binders or effervescent mixtures and/or e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are parts by weight.

EXAMPLE 1

The mixture of 51.6 g of 3-benzoylpyridine, 46.8 g of ethyl iodide, 1.5 g of platinum oxide and 200 ml of anhydrous ethanol is hydrogenated at 3.4 atm until the theoretical amount of hydrogen has been absorbed (about 28 hours). It is filtered, the filtrate evaporated under reduced pressure, the residue triturated with 100 ml of ethyl acetate, the mixture filtered and the residue recrystallized from acetone to yield the 3-benzoyl-1,4,5,6-tetrahydropyridine of the formula

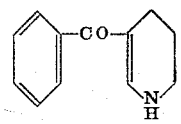

melting at 140°–142.5°.

EXAMPLE 2

The mixture of 325.15 g of 3-benzoyl-1-methylpyridinium iodide, 143.34 g of freshy prepared silver chloride and 250 ml of ethanol is stirred at room temperature overnight. It is filtered, the residue washed with ethanol and the filtrate evaporated. The residue is taken up in 100 ml of methanol and the solution added to the mixture of 1 g of 10% palladium on charcoal, 10 g of triethylamine and 50 ml of methanol. The mixture is hydrogenated at 2.9 atm until the theoretical amount of hydrogen has been absorbed. It is filtered, the filtrate evaporated under reduced pressure, the residue taken up in benzene, the solution concentrated, the concentrate filtered, the filtrate evaporated, the residue distilled and the fraction boiling at 152°–155°/0.08 mm Hg collected, to yield the 3-benzoyl-1-methyl-1,4,5,6-tetrahydropyridine.

The starting material is prepared as follows: The mixture of 18.3 g of 3-benzoylpyridine, 21 g of methyl iodide and 35 ml of methanol is refluxed overnight and evaporated. The residue is combined with 15 ml of methanol and triturated with diethyl ether. It is filtered and washed with diethyl ether, to yield the 3-benzoyl-1-methylpyridinium iodide.

EXAMPLE 3

The mixture of 9.4 g of 3-benzoyl-1,4,5,6-tetrahydropyridine, 6.2 g of acetic anhydride and 20 ml of pyridine is stirred at room temperature for three days. It is evaporated under reduced pressure, the residue taken up in benzene, the mixture again evaporated and the residue triturated with 25 ml of diethyl ether. It is filtered off and recrystallized from diethyl ether, to yield the 1-acetyl-3-benzoyl-1,4,5,6-tetrahydropyridine melting at 88°–89.5°.

EXAMPLE 4

To the mixture of 9.4 g of 3-benzoyl-1,4,5,6-tetrahydropyridine, 50 ml of benzene and 6.07 g of triethylamine, the solution of 5.4 g of ethyl chloroformate in 50 ml of benzene is added dropwise while stirring at 10°–15°. The mixture is stirred overnight at room temperature, 1 g each of triethylamine and ethyl chloroformate are added and the mixture refluxed overnight. After cooling, 50 ml of water are added and the mixture extracted with 100 ml of ethyl acetate. The extract is washed twice with 50 ml of N hydrochloric acid and saturated aqueous sodium chloride, dried, filtered, and evaporated. The residue is distilled and the fraction boiling at 151°–154°/0.1 mm Hg collected, to yield the 3-benzoyl-1-ethoxycarbonyl-1,4,5,6-tetrahydropyridine.

EXAMPLE 5

The mixture of 7 g of 3-(4-chlorobenzoyl)-pyridine, 5.3 g of ethyl iodide and 150 ml of anhydrous ethanol is stirred for half an hour. Thereupon 1 g of platinum oxide are added and the mixture is hydrogenated at 3.5 atm until the theoretical amount of hydrogen has been absorbed. It is filtered, the filtrate evaporated and the residue recrystallized from acetone, to yield the 3-(4-chlorobenzoyl)-1,4,5,6-tetrahydropyridine melting at 172°–174°.

The starting material is prepared as follows: The mixture of 28 g nicotinic acid hydrochloride and 205 g of thionyl chloride is refluxed for half an hour and evaporated under reduced pressure. The residue is taken up in 200 ml of chlorobenzene, the solution cooled to 0° and 8.5 g of powdered aluminum chloride are added portionwise while stirring. The mixture is slowly heated and refluxed overnight. After cooling it is poured over 500 g of ice and 100 ml of concentrated hydrochloric acid while stirring and the mixture washed with diethyl ether. It is treated with charcoal, filtered and the filtrate made basic with aqueous sodium hydroxide. It is extracted with chloroform, the extract dried and evaporated, to yield the 3-(4-chlorobenzoyl)-pyridine.

EXAMPLE 6

The mixture of 5.7 g of 3-(4-methylbenzoyl)-pyridine, 0.57 g of 10 percent palladium on charcoal and 100 ml of ethanol is hydrogenated at 3.4 atm until the theoretical amount of hydrogen has been absorbed. It is filtered, the filtrate evaporated and the residue recrystallized twice from acetone, to yield the 3-(4-methylbenzoyl)-1,4,5,6-tetrahydropyridine, melting at 138°–141°.

In the analogous manner, the 3-(2-methyl, 3-methyl, 2,5-dimethyl and 3-trifluoromethylbenzoyl)-1,4,5,6-tetrahydropyridines are prepared, melting at 155°–157°, 141°–143°, 192°–194° and 130°–132° respectively.

The starting material is prepared as follows: To the mixture of 34 ml of 1,6 molar n-butyl lithium in hexane and 100 ml of diethyl ether, the solution of 7.9 g of 3-bromopyridine in 50 ml of diethyl ether is added while stirring at −35° to −40° under nitrogen. After 20 minutes, the solution of 5.85 g of 4-methylbenzonitrile in 50 ml of diethyl ether is added while stirring at −35°. After 15 minutes, 30 ml of 10 percent hydrochloric acid are added and the mixture stirred at room temperature overnight. The organic layer is separated, extracted with 25 percent hydrochloric acid, the combined aqueous solutions heated to the boil, cooled and made basic with 40 percent aqueous sodium hydroxide. The mixture is extracted with diethyl ether, the extract dried, filtered and evaporated, to yield the 3-(4-methylbenzoyl)-pyridine, melting at 74°–75°. The other isomers thereof as well as the trifluoromethyl compound are analogously prepared.

The mixture of 24 g of nicotinic acid and 130 ml of thionyl chloride is refluxed for 18 hours, cooled and evaporated under reduced pressure. The residue is taken up in 212 ml of p-xylene and 85 g of aluminum chloride are slowly added while stirring and cooling with ice. Thereupon the mixture is refluxed for 6 hours; cooled and poured into ice cold 10 percent hydrochloric acid. The mixture is washed with diethyl ether, the aqueous solution made basic with 50 percent aqueous sodium hydroxide and extracted with chloroform. The extract is treated with charcoal, dried, filtered, evaporated, the residue distilled and the fraction boiling at 91°–95°/0.4 mm Hg collected, to yield the 3-(2,5-dimethylbenzoyl)-pyridine.

EXAMPLE 7

The mixture of 14.44 g of 3-(4-methoxybenzoyl)-pyridine, 250 ml of anhydrous ethanol and 1.4 g of 10 percent palladium on charcoal is hydrogenated at 2.9 atm until the theoretical amount of hydrogen has been absorbed. It is filtered, the filtrate evaporated, the residue triturated with boiling diethyl ether and filtered off, to yield the 3-(4-methoxybenzoyl)-1,4,5,6-tetrahydropyridine, melting at 135°–137°.

The starting material is prepared as the corresponding 4-methyl analog described in Example 6; m.p. 95°–97° (from diethyl ether).

EXAMPLE 8

The mixture of 21.7 g of 3-(2-chlorobenzoyl)-pyridine, 15.6 g of ethyl iodide, 250 ml of anhydrous ethanol and 2 g of platinum oxide is hydrogenated at 2.9 atm for 20.5 hours, during which time the equivalent amount of hydrogen has been absorbed. It is filtered, the filtrate evaporated under reduced pressure, the residue triturated with diethyl ether, taken up in the minimum amount of acetone, the solution clarified with charcoal, filtered, the filtrate cooled and the precipitate formed filtered off, to yield the 3-(2-chlorobenzoyl)-1,4,5,6-tetrahydropyridine, melting at 186°–188°.

In the analogous manner, the 3-(4-bromobenzoyl)-2,4,5,6-tetrahydropyridine is prepared, m.p. 181°–185° (from ethyl acetate, as well as acetone).

The starting materials are obtained according to the method described for the 4-methyl compound in Example 6.

EXAMPLE 9

The solution of 13.48 g of 4-benzoyl-5-oxo-hexanoic acid nitrile in 200 ml of anhydrous ethanol is hydrogenated over 1 g of Raney nickel at 3.2 atm. for about 20 hours, after which time the theoretical amount of hydrogen has been absorbed, yielding the corresponding hexylamine. The mixture is filtered, the filtrate evaporated and the residue recrystallized twice from acetone, to yield the 3-benzoyl-2-methyl-1,4,5,6-tetrahydropyridine of the formula

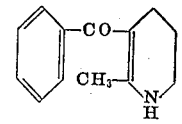

melting at 135°–138°.

The starting material is prepared as follows: The mixture of 55 g of the thallium salt of 1-benzoylacetone and 81 g of 3-bromopropionitrile is stirred at 80°–90° for four hours under nitrogen. It is cooled, filtered, the residue washed with diethyl ether, the filtrate evaporated and the residue distilled to remove the excess of either reagent first. The fraction boiling above 130°–145°/0.1–0.09 mm Hg is collected, to yield the 4-benzoyl-5-oxo-hexanoic acid nitrile.

EXAMPLE 10

According to the methods illustrated by the previous examples, the following compounds of Formula II are obtained from equivalent amounts of the corresponding starting materials:

| No. | R | m | n | R'' | m.p. °C | recryst. from |
|---|---|---|---|---|---|---|
| 1 | 2,3-CH₃ | 2 | 3 | H | 176.5–8.5 | acetone |
| 2 | 3,4-CH₃ | 2 | 3 | H | 168–9 | do. |
| 3 | 3-C₂H₅ | 1 | 3 | H | 108–10 | do. |
| 4 | 2-OH | 1 | 3 | H | 150–2 | dieth. ether |
| 5 | 2-OCH | 1 | 3 | H | 175–8 | acetone |
| 6 | 3,4-OCH₃ | 2 | 3 | H | 156–8 | do. |
| 7 | 3-F | 1 | 3 | H | 129–31 | do. |
| 8 | 4-F | 1 | 3 | H | 156–8 | do. |
| 9 | 3-Cl | 1 | 3 | H | 129.5–1.5 | do. |
| 10 | 2,6-Cl | 2 | 3 | H | 232–4 | do. |
| 11 | 4-CF₃ | 1 | 3 | H | 184–6 | do. |
| 12 | 3,5-CF₃ | 2 | 3 | H | 150–2 | dieth. ether |
| 13 | 4-N(CH₃)₂ | 1 | 3 | H | 201–3 | acetone |
| 14 | 4-CH₃-3-Cl | 2 | 3 | H | 157–9 | do. |
| 15 | 3-CF₃-6-Cl | 2 | 3 | H | 172–4 | do. |
| 16 | H | 1 | 3 | CONH-C₆H₅ | 164–6 | eth. acetate |
| 17 | H | 1 | 3 | CSNH-C₆H₅ | 163.5–5.5 | acetone |

EXAMPLE 11

To the solution of 15.52 g of 1-methyl-1,4,5,6-tetrahydronicotinic acid methyl ester [J. Org. Chem. 33, 747 (1968)] in 100 ml of diethyl ether, the mixture of 50 ml of 2.2 N phenyl lithium in benzene-diethyl ether (7:3) and 50 ml of diethyl ether is added slowly, while stirring at 0°–10° under nitrogen. Thereupon the mixture is slightly acidified with 10 percent hydrochloric acid and stirred at 25° for one hour. It is diluted with water, the organic phase separated, dried, evaporated, the residue distilled and the fraction boiling at 172°–174°/0.1 mm Hg collected, to yield the 3-benzoyl-1-methyl-1,4,5,6-tetrahydropyridine; it is identical with that obtained according to Example 2.

EXAMPLE 12

The solution of 17.22 g of 1-methyl-1,4,5,6-tetrahydronicotinonitrile [J. Org. Chem. 33, 747 (1968)] in 100 ml of tetrahydrofuran is added to the mixture of 50 ml of 2.2N phenyl lithium in benzene-diethyl ether (7:3) and 50 ml of diethyl ether, while stirring at 0°–10° under nitrogen. After stirring for one hour at room temperature, the mixture (containing the lithium salt of the corresponding imine), is cooled with ice, the pH thereof adjusted to 1 with 10 percent hydrochloric acid and the mixture stirred at room temperature overnight. It is diluted with water, extracted with ethyl acetate, the extract dried, evaporated, the residue distilled and the fraction boiling at 172°–174°/0.1 mm Hg collected, to yield the 3-benzoyl-1-methyl-1,4,5,6-tetrahydropyridine; it is identical with that obtained according to Example 2.

EXAMPLE 13

The solution of 5 g of 3-benzoyl-4-oxo-valeronitrile in 100 ml of anhydrous ethanol is hydrogenated over 0.5 g of Raney nickel at 3.2 atm. until the theoretical amount of hydrogen has been absorbed, to yield the corresponding pentylamine. The mixture is filtered, the filtrate evaporated and the residue triturated several times with diethyl ether. 1.9 g thereof are taken up in 15 ml of hot ethyl acetate, the solution cooled, filtered and the filtrate evaporated, to yield the 3-benzoyl-2-methyl-4,5-dihydropyrrole of the formula

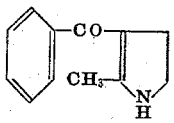

showing the correct molecule ion in the mass spectrum.

In the analogous manner the 3-benzoyl-2-methyl-4,5,6,7-tetrahydroazepine of the formula

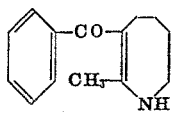

is obtained from the 5-benzoyl-6-oxo-heptanoic acid nitrile.

The starting material is prepared as follows: The mixture of 81.1 g of 1-benzoylacetone, 124.7 g of thallous ethoxide and 500 ml of benzene is stirred at room temperature for one hour. It is diluted with 500 ml of diethyl ether, the resulting suspension stirred for one hour and filtered, to yield the thallium salt of 1-benzoylacetone melting at 100°–102°.

The mixture of 55 g thereof and 72 g of bromoacetonitrile is stirred at 80°–90° for four hours under nitrogen. It is cooled, filtered, the residue washed with diethyl ether, the filtrate evaporated and the residue distilled to remove the excess of either reagent first. The fraction boiling at 130°–145°/0.1–0.09 mm Hg is collected, to yield the 3-benzoyl-4-oxo-valeronitrile.

The mixture of 36.55 g of the thallium salt of 1-benzoylacetone and 65 g of 4-iodobutyronitrile is stirred at 90°–100° for four hours under nitrogen. It is cooled, filtered, the residue washed with benzene and the filtrate evaporated under reduced pressure. The residue is heated first to 152°/0.06 mm Hg to remove excess reagents and the following fraction collected, to yield the 5-benzoyl-6-oxo-heptanoic acid nitrile.

EXAMPLE 14

The mixture of 12.23 g of 3-nicotinoylpyridine, 250 ml of anhydrous ethanol and 1.2 g of palladium on charcoal is hydrogenated at 2.7 atm until the theoretical amount of hydrogen has been absorbed (about 21 hours). It is filtered, the filtrate evaporated under reduced pressure and the residue recrystallized from acetone, to yield the 3-nicotinoyl-1,4,5,6-tetrahydropyridine of the formula

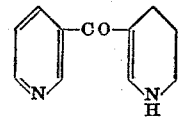

melting at 141°–143°.

The starting material is prepared as follows: To the mixture of 170 ml of 1.6N n-butyl lithium in hexane and 125 ml of diethyl ether, the solution of 24 ml of 3-bromopyridine in 100 ml of diethyl ether is added dropwise while stirring at −35° under nitrogen. After 10 minutes the solution of 26.03 g of nicotinonitrile in 350 ml of diethyl ether is added dropwise while stirring at about −40°. After ½ hour 125 ml of 10 percent hydrochloric acid are added at a rate to maintain about −15°, whereupon the mixture is allowed to warm up to room temperature. The aqueous layer is separated, the organic layer extracted with 125 ml of 25 percent hydrochloric acid and the combined acidic solutions heated to the boil for 10 minutes. After cooling the pH thereof is adjusted to 10 with 40 percent aqueous sodium hydroxide, extracted with diethyl ether, the extract washed with saturated aqueous sodium chloride, filtered, dried and evaporated under reduced pressure. The residue is recrystallized from diethyl ether, to yield the 3-nicotinoylpyridine melting at 114°–116°.

EXAMPLE 15

Preparation of 10,000 tablets each containing 100 mg of the active ingredient:

Formula:

| | |
|---|---|
| 3-benzoyl-1,4,5,6-tetrahydropyridine | 1,000.00 g |
| Lactose | 2,535.00 g |
| Corn starch | 125.00 g |
| Polyethylene glycol 6,000 | 150.00 g |
| Talcum powder | 150.00 g |
| Magnesium stearate | 40.00 g |
| Purified water | q.s. |

Procedure

All the powders are passed through a screen with openings of 0.6 mm. Then the drug substance, lactose, talcum, magnesium stearate and half of the starch are mixed in a suitable mixer. The other half of the starch is suspended in 65 ml of water and the suspension added to the boiling solution of the polyethylene glycol in 260 ml of water. The paste formed is added to the powders which are granulated, if necessary, with an additional amount of water. The granulate is dried overnight at 35°, broken on a screen with 1.2 mm openings and compressed into tablets, using concave punches with 10.3 mm diameter, uppers bisected.

In the analogous manner tablets are prepared from the other compounds of the previous examples, especially such of the 3-(3-fluoro or chlorobenzoyl)-1,4,5,6-tetrahydropyridine.

I claim:

1. A 3-aroyl-lower alkenyleneimine of the formula

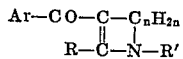

wherein Ar is unsubstituted phenyl, or phenyl substituted by up to two members selected from lower alkyl, hydroxy, lower alkoxy, lower alkanoyloxy, halogeno, trifluoromethyl, amino or di-lower alkylamino, the alkylene group $C_nH_{2n}$ separates the carbon from the nitrogen atom by 2–4 carbon atoms, n is an integer from 2 to 7, R is hydrogen or lower alkyl and R' is hydrogen, lower alkanoyl, lower alkoxy-carbonyl, Ar-lower alkanoyl, Ar-carbonyl, carbamoyl, N-Ar-carbamoyl or -thiocarbamoyl, or therapeutically acceptable acid addition salts of the amino compounds.

2. A compound as claimed in claim 1, in which formula Ar is phenyl, (lower alkyl)$_m$-phenyl, (hydroxy)$_m$-phenyl, (lower alkoxy)$_m$-phenyl, (lower alkanoyloxy)$_m$-phenyl, (halogeno)$_m$-phenyl, (trifluoromethyl)$_m$-phenyl, (amino)$_m$-phenyl, (di-lower alkylamino)$_m$-phenyl, (lower alkyl or trifluoromethyl)-halophenyl, $m$ is the integer 1 or 2, the alkylene group $C_nH_{2n}$ separates the carbon from the nitrogen atom by 2–4 carbon atoms, $n$ is an integer from 2 to 7, R is hydrogen or lower alkyl, and R' is hydrogen or lower alkanoyl, lower alkoxy-carbonyl, phenyl-carbamoyl or -thiocarbamoyl or a therapeutically useful acid addition salt of the amino compounds.

3. A compound as claimed in claim 1, and corresponding to the formula

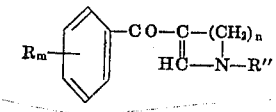

in which R is hydrogen, methyl, ethyl, hydroxy, methoxy, acetoxy, fluoro, chloro, bromo, trifluoromethyl, amino or dimethylamino, $m$ is the integer 1 or 2, R'' is hydrogen, acetyl, propionyl, pivaloyl, methoxy- or ethoxy-carbonyl, N-phenyl-carbamoyl or -thiocarbamoyl and $n$ is the integer 3, or a therapeutically useful acid addition salt of the amino compounds.

4. A compound as claimed in claim 3, in which formula R is hydrogen, fluoro or chloro in the meta- or para-position, R'' is hydrogen and $m$ is the integer 1 and $n$ the integer 3.

5. A compound as claimed in claim 3 and being the 3-benzoyl-1,4,5,6-tetrahydropyridine.

6. A compound as claimed in claim 3 and being the 3-(3-fluoro or chlorobenzoyl)-1,4,5,6-tetrahydropyridine.

* * * * *